United States Patent [19]

Kimura et al.

[11] 4,332,697

[45] Jun. 1, 1982

[54] PROCESS FOR THE PREPARATION OF CATALYST COMPONENT FOR THE POLYMERIZATION OF α-OLEFINS

[75] Inventors: Kouhei Kimura, Kanagawa; Hiroyasu Ohba; Atsushi Murai, both of Chigasaki, all of Japan

[73] Assignee: Toho Titanium Co., Ltd., Tokyo, Japan

[21] Appl. No.: 216,766

[22] Filed: Dec. 15, 1980

[30] Foreign Application Priority Data

Dec. 31, 1979 [JP] Japan .................................. 54-173241

[51] Int. Cl.³ .............................................. C08F 4/64
[52] U.S. Cl. ................................... 252/429 B; 526/125
[58] Field of Search ....................................... 252/429 B

[56] References Cited

U.S. PATENT DOCUMENTS

| | | | |
|---|---|---|---|
| 4,223,118 | 9/1980 | Tsubaki et al. | 252/429 B X |
| 4,243,552 | 1/1981 | Welch et al. | 252/429 B |

FOREIGN PATENT DOCUMENTS 47-41676 10/1972 Japan .
50-126590 10/1975 Japan .
52-87489 7/1977 Japan .

*Primary Examiner*—Patrick Garvin
*Attorney, Agent, or Firm*—Fisher, Christen & Sabol

[57] ABSTRACT

Disclosed is a process for the preparation of the former catalyst component of a catalyst for the polymerization of α-olefins composed of a titanium-based catalyst component and an organo aluminium compound. According to the above process, a magnesium halide is copulverized with aluminium isopropoxide to form a first copulverization product, to which an electron donor compound is added for copulverization to form a second copulverization product, and the second copulverization product is brought into contact with a titanium halide followed by washing with an inert organic solvent.

In the polymerization of α-olefins by use of the former catalyst component as above, both polymerization activity per unit weight of the catalyst component and yield of stereoregular polymers are remarkably increased.

10 Claims, No Drawings

PROCESS FOR THE PREPARATION OF CATALYST COMPONENT FOR THE POLYMERIZATION OF α-OLEFINS

BACKGROUND OF THE INVENTION (1) Field of the Invention

This invention relates to a process for the preparation of a titanium-based catalyst component (hereinafter referred to simply as a catalyst component) of a catalyst for use in the polymerization of α-olefins composed of the titanium-based catalyst component and an organo aluminium compound, where polymerization includes homopolymerization and copolymerization thereof.

That is, this invention relates to a process for the preparation of a catalyst component having such a high activity that when applied to the polymerization of α-olefins it serves to show a high activity, and stereoregular polymers can be obtained in high yields, and more particularly relates to a process for the preparation of a catalyst component, which comprises copulverizing for physicochemical treatment a magnesium halide with aluminium isopropoxide to form a first copulverization product, adding an electron donor compound to the first copulverization product for physicochemical treatment to obtain a second solid copulverization product, contacting the second solid copulverization product with a titanium halide in the liquid phase or in the gaseous phase to be reacted therewith, and washing a resulting reaction product with an inert organic solvent.

(2) Description of the Prior Art

A titanium halide is well known in the art as a catalyst component for use in the polymerization of α-olefins. However, in the polymerization with the titanium halide known as the conventional catalyst component, the yield of polymers per unit weight of the catalyst component or of titanium moiety in the catalyst component (hereinafter referred to simply as a polymerization activity per unit weight of titanium) is so low that the so-called deashing process for subsequently removing catalyst residues from the polymer product is indispensable in order to obtain an industrially applicable polymer product. In the deashing process, alcohols or chelating agents are used in large amounts, so that the deashing process needs an apparatus for recovery thereof as well as the deashing apparatus itself, and consequently has many problems accompanying therewith relative to resources, energy, and the like. Thus, the deashing process raises a great problem to be solved urgently in the art. A number of studies and suggestions have been made for enhancing the polymerization activity per unit weight of titanium in the catalyst component, so that the complicated deashing process may be dispensed with.

Especially as a recent tendency, a large number of suggestions have been made such that the polymerization activity per unit weight of titanium in the catalyst component is remarkably enhanced in the polymerization of α-olefins with a catalyst component prepared by supporting a transition-metal compound as an active ingredient such as a titanium halide on a porous carrier material so that the active ingredient may act effectively. Further, various suggestions have been made on improvements in carrier materials themselves, effects on the improvement in method of supporting, addition of a third ingredient, and the like.

For example, Japanese Patent Publication No. 41676/'72 discloses a process for the preparation of a catalyst component in which a halide of magnesium or zinc, which is pulverized for activation, is either suspended in liquid titanium tetrachloride to support titanium thereon followed by washing with an organic solvent, or brought into contact with an organic solvent for treatment beforehand followed by evaporating the solvent for removal and then suspended in liquid titanium tetrachloride to support titanium thereon followed by washing with an organic solvent, and thereafter the resulting reaction mixture obtained by either one of the procedures as above is subjected to a solid-liquid separation procedure to obtain a solid reaction product for use in the polymerization of α-olefins as the catalyst component. The aforesaid process shows a great effect on the polymerization activity per unit weight of titanium in the catalyst component, but has such a drawback that the yield of stereoregular polymers, which may also be referred to as an overall yield of crystalline polymers, remains at a very low level.

As a process to eliminate drawbacks above described, Japanese Patent Laid-open Publication No. 126590/'75 discloses a process for the preparation of a catalyst component, in which a magnesium halide is brought into contact with an electron donor compound as a third ingredient specifically with an aromatic carboxylic acid ester by a mechanical means to form a solid reaction product, and the solid reaction product thus obtained is brought into contact with titanium tetrachloride in the liquid phase or in the gaseous phase to obtain the catalyst component. According to this process, the polymerization activity per unit weight of titanium is increased to such an extent that the deashing process may satisfactorily be dispensed with for practical use thereof. However, the yield of stereoregular polymers remains at an unsatisfactory level to be insufficient for industrial practical use.

As a process to improve the aforesaid process, Japanese Patent Laid-open Publication No. 87489/'77 discloses a catalyst component for the polymerization of α-olefins, which is obtained as the most preferable embodiment thereof by copulverizing a compound of a metal selected from aluminium, tin, and germanium containing at least an organic group or a halogen with a halogen containing magnesium compound in the presence of an organic acid ester to be brought into contact with each other, and contacting the resulting copulverization product with a titanium compound for reaction. This catalyst component shows a considerably favorable effect on the polymerization activity per unit weight of titanium and the yield of stereoregular polymers compared with that in the aforesaid process, but still remains unsatisfactory for the demand in the highly developing technical field to be improved taking into consideration polymerization characteristic values such as the yield of polymers per unit weight of a catalyst component (hereinafter referred to as a polymerization activity per unit weight of a catalyst component) and the yield of stereoregular polymers.

All the catalyst components described above have a tendency to put too much emphasis on increase in the polymerization activity per unit weight of titanium in the catalyst component, and consequently the yield of stereoregular polymers is sacrified therefor to some extent. Further, the fact that a less emphasis is put on the polymerization activity per unit weight of the catalyst component is responsible for having caused adverse effects due to other residues than titanium moiety residue on the polymer product.

Titanium has been the primary residue to be avoided among catalyst residues which have adverse effects on the polymer product. Accordingly, efforts have been made for dispensing with the deashing process for the removal of catalyst residues by increasing the polymerization activity per unit weight of titanium with considerably favorable results. This idea itself of dispensing with the deashing process is beyond question. However, it is well known in the art that other materials contained in the catalyst component than titanium such as ingredients of carrier materials in the aforesaid supported catalyst component, for example, have unfavorable effects on the polymer product and apparatus for polymerization.

SUMMARY OF THE INVENTION

It is an object of this invention to provide a process for the preparation of a catalyst component for the polymerization of α-olefins for increasing the polymerization activity per unit weight of the catalyst component as well as the yield of stereoregular polymers as a whole.

It is another object of this invention to provide an improved process for the preparation of a catalyst component for the polymerization of α-olefins, in which the deashing process can be dispensed with.

That is, the gist of this invention consists in that (a) a magnesium halide represented by the general formula $MgX_2$ where X is a halogen atom, is copulverized for physicochemical treatment with (b) aluminium isopropoxide to form a first copulverization product, (c) an electron donor compound is then added to the first copulverization product for physicochemical treatment to obtain a second solid copulverization product, which is then brought into contact with (d) a titanium halide represented by the general formula $TiX_4$ where X is a halogen atom, in the liquid phase or in the gaseous phase to be reacted therewith, and a resulting reaction product is then washed with an inert organic solvent until no halogen atom is detected in the solvent after washing followed either by subjecting the resulting mixture to solid-liquid separation procedure to be dried or by further adding to the resulting mixture an appropriate amount of inert organic solvent to form a slurry, so that the product obtained by either one of the above procedures may be used directly as the catalyst component.

The process of the present invention makes it possible not only to increase a supported degree of titanium as an active ingredient and the polymerization activity per unit weight of titanium in the catalyst component, but also to have an excellent effect on the yield of stereoregular polymers keeping the polymerization activity per unit weight of the catalyst component at a satisfactorily high level.

DETAILED DESCRIPTION OF THE PREFERRED EMBODIMENTS

Examples of the magnesium halide used in the present invention and represented by the general formula $MgX_2$ where X is a halogen atom, include anhydrous magnesium dichloride, magnesium dibromide, magnesium diiodide, and the like, the magnesium dichloride being the most preferred.

The electron donor compound used in the present invention is selected from organic compounds which contain at least one atom selected from oxygen, nitrogen, sulfer, and phosphorus atoms, for example, ethers, esters, ketones, amines, phosphines, phosphine amides, and the like. Specific examples of the electron donor compound include aliphatic ethers such as diethyl ether, aromatic ethers such as anisole, aliphatic carboxylic acid esters such as ethyl acetate and methyl methacrylate, aromatic carboxylic acid esters such as ethyl benzoate, methyl toluate, ethyl toluate, ethyl anisate, and diethyl phthalate, ketones such as acetone, phosphines such as triphenyl phosphine, phosphine amides such as hexaphosphine amide, and the like, the aromatic carboxylic acid esters being particularly preferred.

Examples of the titanium halide represented by the general formula $TiX_4$ where X is a halogen atom, include titanium tetrachloride, titanium tetrabromide, titanium tetraiodide, and the like, the titanium tetrachloride being preferred. The titanium halide may be used in the form of a complex thereof with the electron donor compound.

Examples of the inert organic solvent used in the present invention include saturated aliphatic and aromatic hydrocarbons such as hexane, heptane, octane, cyclohexane, benzene, and toluene. The inert organic solvent is preferably subjected to a thorough dehydration with molecular sieves or the like to be used.

The amount to be used of the ingredients in the catalyst component is not specifically limited unless it has adverse effects on the performance of the catalyst component formed therefrom, but normally aluminium isopropoxide is used in an amount of from 0.001 to 1 mole, preferably 0.005 to 0.5 mole, and the electron donor compound is used in an amount of from 0.01 to 10 moles, preferably 0.05 to 1 mole per mole of the magnesium halide respectively.

The copulverization of the magnesium halide with aluminium isopropoxide and the subsequent copulverization of the first copulverization product with the electron donor compound are preferably performed by a mechanical processing by use of a mill used for pulverizing powders such as a ball mill, vibrating mill, column type attritor, and impact mill. The copulverization time, which may, of course, vary according to the performance of the mill used, is preferably in the range of from 0.5 to 10 hours in the case of the copulverization of the magnesium halide with aluminium isopropoxide. Further, the subsequent copulverization of the first copulverization product with the electron donor compound is also performed by the same mechanical processing as above, and the copulverization time is generally in the range of from 5 to 100 hours.

The temperature at which the ingredients of the catalyst component are subjected to copulverization is not specifically limited so long as the ingredients are pulverizable, but is preferably 80° C. or lower.

The second solid copulverization product thus obtained is brought into contact with the titanium halide in the liquid phase or in the gaseous phase to support titanium thereon, and the second solid copulverization product with titanium supported thereon is washed with the inert organic solvent to obtain the catalyst component of the present invention.

The titanium halide is brought into contact with the second solid copulverization product by use of a reactor equipped with a stirrer and a cooling device normally in a temperature range of from 20° to 100° C. The contact processing time is not specifically limited so long as it is within such a range that titanium in the titanium halide is sufficiently supported on the second solid copulverization product, but normally is in the range of from 0.5 to 10 hours.

The resulting slurry product is washed with the inert organic solvent, where washing is deemed to be completed when no halogen atom is detected in the solvent after washing. Consequently a resulting product thus washed is subjected to solid-liquid separation procedure for drying, or appropriate amount of inert organic solvent is further added to the resulting product to form a slurry so as to be used directly as the catalyst component for use in the polymerization of α-olefins according to the present invention.

All the procedures described as above in the present invention are conducted under such conditions as to eliminate oxygen, water, and the like as much as possible, for example, in an atmosphere of an inert gas such as nitrogen, argon, or the like.

The catalyst component thus obtained is combined as a transition metal component of Ziegler-type catalyst with an organo aluminium compound represented by the general formula $AlR_mX_{3-m}$ where R is hydrogen or an alkyl radical having 1 to 10 carbon atoms, X is a halogen atom, and m is an integer of from 1 to 3 to form a catalyst for the polymerization of α-olefins. The organo aluminium compound is used in a molar ratio of from 1 to 300, preferably 1 to 100 per atom of titanium in the catalyst component. In the polymerization of α-olefins, a third ingredient such as aromatic carboxylic acid esters may be added.

The polymerization of α-olefins may be performed in the presence of either an inert organic solvent or a liquid olefin monomer. The polymerization temperature is below 200° C., preferably below 100° C., and the polymerization pressure is below 100 kg/cm² gauge, preferably below 50 kg/cm² gauge.

Examples of olefins homopolymerized or copolymerized by use of the catalyst component prepared by the process of the present invention include ethylene, propylene, 1-butene, 4-methylpentene-1, and the like.

The following Examples and Comparative Examples illustrate the present invention more in detail, but these Examples are not intended to limit it thereto.

EXAMPLE 1

(Preparation of catalyst component)

Commercially available anhydrous magnesium chloride (25 g), and 1.0 g of aluminium isopropoxide are charged into a 1-liter vibrating mill pot, 3/5 the total volume of which is filled with a stainless ball having a diameter of 15 mm in an atmosphere of nitrogen to be copulverized for treatment for one hour at a number of vibration of 1430 v.p.m. and amplitude of vibration of 3.5 mm. After the completion of copulverization, 7.8 g of ethyl benzoate is added thereto in nitrogen atmosphere to be further copulverized for treatment under the same conditions as above. Both copulverization treatments described above are conducted at room temperature. To a 200 ml round flask fitted with a cooler and stirrer, the air in which is replaced by nitrogen, 50 ml of titanium tetrachloride and 10 g of the second solid copulverization product are charged to be reacted with agitation at 65° C. for 2 hours. After the completion of the reaction, the reaction mixture is cooled down to room temperature and left at rest for removing the resulting supernatant liquid by decanting. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 2.08% by weight.

Polymerization of propylene

To a 1.5 liter autoclave fitted with a stirrer, the air in which is thoroughly replaced by nitrogen, 500 ml of dehydrated n-heptane, 20 mg of triethyl aluminium, and 0.90 mg as titanium of the catalyst component obtained as above are charged successively in an atmosphere of nitrogen. Thereafter the resulting mixture is heated to 60° C. and subjected to propylene polymerization under a pressure of 4 kg/cm² gauge for 2 hours introducing thereto propylene gas. After the completion of polymerization reaction, solid polymers thus obtained are collected by filtration and dried by heating at 80° C. under reduced pressure. On the other hand, the filtrate is thickened to obtain polymers soluble in a solvent used in polymerization.

The amount of the polymers soluble in the solvent used in polymerization is represented by (A), and the amount of the solid polymers obtained as above is represented by (B). The solid polymers are subjected to extraction with boiling n-heptane for 6 hours to obtain polymers insoluble in boiling n-heptane, the amount of which is represented by (C). The polymerization activity (D) per unit weight of the catalyst component is represented by the formula $$(D) = \frac{[(A) + (B)] (g)}{\text{amount of catalyst component (g)}}$$

and the yield (E) of crystalline polymers is represented by the formula $$(E) = \frac{(C)}{(B)} \times 100\%$$

Further, the overall yield (F) of crystalline polymers is represented by the formula $$(F) = \frac{(C)}{(A) + (B)} \times 100\%.$$

Results thus obtained are shown in Table-1.

EXAMPLE 2

The procedures of Example 1 are repeated except that 2.0 g of aluminium isopropoxide is added to prepare a catalyst component. The titanium content in the solids separated is 1.97% by weight.

In the polymerization of propylene, the procedures of Example 1 are also repeated except that the catalyst component thus obtained is added in an amount of 1.39 mg as titanium. Results thus obtained are shown in Table-1.

EXAMPLE 3

The procedures of Example 1 are repeated except that the copulverization time in the copulverization after the addition of ethyl benzoate is 40 hours to prepare a catalyst component. The titanium content in the solids separated is 2.09% by weight.

In the polymerization of propylene, the procedures of Example 1 are also repeated except that the catalyst component thus obtained is added in an amount of 1.35 mg as titanium. Results thus obtained are shown in Table-1.

EXAMPLE 4

The procedures of Example 2 are repeated except that the copulverization time for the copulverization treatment of anhydrous magnesium chloride with aluminium isopropoxide is 5 hours to prepare a catalyst component. The titanium content in the solids separated is 1.88% by weight.

In the polymerization of propylene, the procedures of Example 1 are also repeated except that the catalyst component thus obtained is added in an amount of 1.05 mg as titanium. Results thus obtained are shown in Table-1.

COMPARATIVE EXAMPLE 1

The procedures of Example 1 are repeated except that no aluminium isoproxide is added to prepare a catalyst component. The titanium content in the solids separated is 1.40% by weight.

In the polymerization of propylene, the procedures of Example 1 are also repeated except that the catalyst component thus obtained is added in an amount of 0.83 mg as titanium. Results thus obtained are shown in Table-1.

COMPARATIVE EXAMPLE 2

The procedures of Example 1 are repeated except that anhydrous magnesium chloride, aluminium isopropoxide and ethyl benzoate are added simultaneously at the same weight ratio as in Example 1 for effecting a simultaneous copulverization thereof for 18 hours to prepare a catalyst component. The titanium content in the solids separated is 1.72% by weight.

In the polymerization of propylene, the procedures of Example 1 are also repeated except that the catalyst component thus obtained is added in an amount of 1.26 mg as titanium. Results thus obtained are shown in Table-1.

COMPARATIVE EXAMPLE 3

The procedures of Example 1 are repeated except that anhydrous magnesium chloride is copulverized for treatment with ethyl benzoate for one hour beforehand followed by adding thereto aluminium isopropoxide for conducting a further copulverization therewith for 17 hours to prepare a catalyst component. The titanium content in the solids separated is 1.66% by weight.

In the polymerization of propylene, the procedures of Example 1 are also repeated except that the catalyst component thus obtained is added in an amount of 1.12 mg as titanium. Results thus obtained are shown in Table-1.

COMPARATIVE EXAMPLE 4

The procedures of Example 1 are repeated except that aluminium ethoxide is used in place of aluminium isopropoxide to prepare a catalyst component. The titanium content in the solids separated is 1.69% by weight.

In the polymerization of propylene, the procedures of Example 1 are also repeated except that the catalyst component thus obtained is added in an amount of 1.42 mg as titanium. Results thus obtained are shown in Table-1.

TABLE 1

| | Examples | | | | Comparative Examples | | | |
|---|---|---|---|---|---|---|---|---|
| | 1 | 2 | 3 | 4 | 1 | 2 | 3 | 4 |
| Amount of polymers soluble in the solvent used in polymerization (A)g | 6 | 7 | 7 | 6 | 8 | 7 | 8 | 10 |
| Amount of solid polymers (B)g | 189 | 254 | 224 | 198 | 187 | 227 | 220 | 275 |
| Amount of polymers insoluble in boiling n-heptane (C)g | 183 | 246 | 216 | 190 | 179 | 215 | 209 | 262 |
| Polymerization activity per unit weight of catalyst component | 4500 | 3700 | 3600 | 3600 | 3300 | 3200 | 3400 | 3400 |
| Yield of crystalline polymers (%) | 97.0 | 96.8 | 96.6 | 95.8 | 95.5 | 94.7 | 95.1 | 95.3 |
| Overall yield of crystalline polymers (%) | 94.0 | 94.3 | 93.6 | 93.1 | 91.6 | 91.9 | 91.8 | 92.0 |

The results of Table-1 show that when polymerization of α-olefins is carried out by use of the catalyst component obtained by the process of the present invention, in which a magnesium halide as a carrier material is copulverized for treatment to form a first copulverization product, to which an electron donor compound is then added for further copulverization to form a second solid copulverization product, and thereafter the second solid copulverization product is brought into contact with titanium tetrahalide followed by washing with an inert organic solvent, polymerization characteristic values, particularly, both polymerization activity per unit weight of the catalyst component and yield of stereoregular polymers are favorably increased as a whole. Favorable results have been newly obtained by the studies made by the present inventors from the standpoint of increasing polymerization characteristic values, particularly, both polymerization activity per unit weight of the catalyst component and yield of stereoregular polymers, though efforts, which have previously been made for accomplishing such an object as to dispense with the so-called deashing process by increasing the polymerization activity per unit weight of titanium in the development of such supported catalyst components, should be appreciated as such.

As described above, the improvements in the yield of stereoregular polymers as well as the polymerization activity per unit weight of the catalyst component have been made by placing a particular emphasis on the fact that not only the titanium moiety in the catalyst residues, but also other materials as ingredients in the catalyst component, for example, chlorine and magnesium in a catalyst component supported on magnesium chloride have adverse effects considerably on the polymer product.

In summarizing the technical characteristics of the novel process of the present invention, a magnesium halide as a carrier is copulverized for treatment with aluminium isopropoxide by a dry mechanical means to form a first copulverization product, to which an electron donor compound is added for copulverizing therewith by the same mechanical means as above to form a second solid copulverization product, and the second solid copulverization product is then brought into contact with a titanium halide as an active ingredient, whereby the supported degree of titanium on the carrier is increased with the excellent results as described above. Thus, the process of the present invention is expected to provide a catalyst component of highly practical use for industrial applications.

What is claimed is:

1. A process for the preparation of a catalyst component for the polymerization of α-olefins which comprises copulverizing for treatment (a) a magnesium halide represented by the general formula $MgX_2$ where X is a halogen atom, with (b) aluminium isopropoxide to form a first copulverization product, subsequently adding (c) an electron donor compound to said first copulverization product for copulverization treatment therewith to form a second solid copulverization product, contacting said second solid copulverization product with (d) a titanium halide represented by the general formula $TiX_4$ where X is a halogen atom in the liquid phase or in the gaseous phase to be reacted therewith, and washing the resultant reaction product with an inert organic solvent, whereby the catalyst component is obtained.

2. A process claimed in claim 1, wherein said magnesium halide is magnesium chloride.

3. A process claimed in claim 1, wherein said electron donor compound is an aromatic carboxylic acid ester.

4. A process claimed in claim 1, wherein said titanium halide is titanium tetrachloride.

5. A process claimed in claim 1, wherein aluminium isopropoxide is used in an amount of from 0.001 to 1 mole per mole of said magnesium halide.

6. A process claimed in claim 1, wherein said electron donor compound is used in an amount of from 0.01 to 1 mole per mole of said magnesium halide.

7. A process claimed in claim 1, wherein said second solid copulverization product is brought into contact with said titanium halide at a temperature of from 20° to 100° C. for 0.5–10 hours.

8. A process claimed in claim 1, wherein both copulverization of said magnesium halide with aluminium isopropoxide and copulverization of said first copulverization product with said electron donor compound are conducted by a dry mechanical means.

9. A process claimed in claim 8, wherein said magnesium halide is copulverized with aluminium isopropoxide at a temperature up to 80° C. for 0.5–10 hours.

10. A process claimed in claim 8, wherein said first copulverization product is copulverized with said electron donor compound at a temperature up to 80° C. for 5–100 hours.

* * * * *